United States Patent [19]

Kawasaki et al.

[11] 4,285,586
[45] Aug. 25, 1981

[54] CAMERA CONTROLLER FOR FLASHGUN OPERATION

[75] Inventors: Masahiro Kawasaki, Tokyo; Sinji Urata, Tachikawa, both of Japan

[73] Assignee: Asahi Kogaku Kogyo Kabushiki Kaisha, Tokyo, Japan

[21] Appl. No.: 63,305

[22] Filed: Aug. 2, 1979

[30] Foreign Application Priority Data

Aug. 25, 1978 [JP] Japan .......................... 53-117217[U]

[51] Int. Cl.³ .................... G03B 15/03; G03B 17/18
[52] U.S. Cl. ................................ 354/34; 354/50; 354/127; 354/139; 354/141
[58] Field of Search .............. 354/23 R, 32–35, 354/60 F, 127, 128, 141, 133, 139, 145, 149, 50, 51, 289

[56] References Cited

U.S. PATENT DOCUMENTS

| | | | |
|---|---|---|---|
| 3,675,547 | 7/1972 | Uchiyama et al. | 354/33 X |
| 4,047,194 | 9/1977 | Nakamura et al. | 354/149 |
| 4,079,385 | 3/1978 | Nakamura et al. | 354/23 R |
| 4,091,396 | 5/1978 | Sahara et al. | 354/149 X |
| 4,126,877 | 11/1978 | Ohtaki et al. | 354/149 |

FOREIGN PATENT DOCUMENTS 2808642  8/1978  Fed. Rep. of Germany ............ 354/33

*Primary Examiner*—L. T. Hix
*Assistant Examiner*—William B. Perkey

*Attorney, Agent, or Firm*—Sughrue, Mion, Zinn, Macpeak and Seas

[57] ABSTRACT

A device for controlling a camera according to whether or not a flashgun is mounted on the camera and whether or not the flashgun is charged. The camera operation may be an electrically controlling an automatic shutter operation or a manual shutter operation. An input terminal transmits a charge signal of the flashgun and a detection switch determines whether or not the flashgun is mounted on the camera. In a first state in which a flashgun with a charge signal terminal is mounted on the camera but the flashgun is not charged yet, the detection switch is turned on or off. A voltage lower than a predetermined value is applied to the input terminal, and an ordinary automatic shutter control or an ordinary manual shutter control is obtained according to information provided by the detection switch and information provided by the input terminal. In a second state in which the flashgun mounted on the camera has been charged, the detection switch is turned on or off, a voltage higher than said predetermined value is applied to the input terminal, and a flash synchronization shutter control is obtained according to information provided by the detection switch and information provided by the input terminal. In a third state in which a flashgun having no charge signal terminal is mounted on the camera, the detection switch is merely turned on or off, the input terminal is in open state, and the X shutter control is obtained according only to information provided by the detection switch.

9 Claims, 2 Drawing Figures

CAMERA CONTROLLER FOR FLASHGUN OPERATION

BACKGROUND OF THE INVENTION

This invention relates to a device for controlling a camera according to whether or not a flashgun with a charge signal terminal (hereinafter referred to as "an exclusive flashgun" when applicable) or a flashgun other than the exclusive flashgun (hereinafter referred to as "an ordinary flash gun" when applicable) is charged and according to whether or not it is mounted on the camera.

A conventional photographing operation using a flashgun is rather troublesome in that it is necessary to confirm whether or not the flashgun is operable. This is generally confirmed by referring to a charge display lamp or the like which indicates whether or not the charge condition of the flashgun is satisfactory before the shutter is released. If the flashgun is not yet charged, no light, or an insufficient quantity is emitted by the flashgun when the shutter is released. Thus, since the flash synchronization exposure time (hereinafter referred to as "an X time" when applicable) is manually set, a correct exposure cannot be obtained.

SUMMARY OF THE INVENTION

Accordingly, an object of this invention is to eliminate all of the above-described drawbacks accompanying a conventional photographing operation using a flashgun.

More specifically, an object of the invention is to provide a control device for a camera, in which, in the case where an exclusive flashgun is used, the charge signal of the flashgun is detected and is displayed in the view finder to show whether or not the flashgun is operable. Also, the exposure time control is switched over to the X time control.

In the case where an ordinary flashgun is used and therefore no charge signal can be detected, a switch is used for determining whether or not the flashgun is installed on the camera (hereinafter referred to as "a detection switch" when applicable) and the exposure time control is switched to the X time control. This is displayed in the view finder. Hence both of the cases failure in the photographing operation using the flashgun are eliminated.

DESCRIPTION OF THE PREFERRED EMBODIMENT

Figure 1:
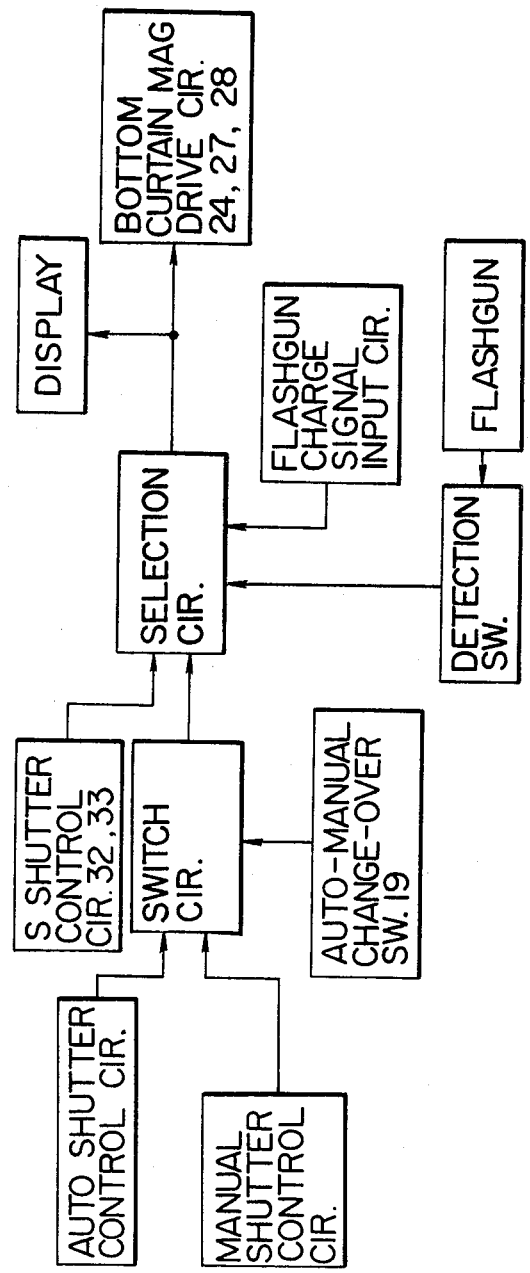
FIG. 1 is a block diagram showing a control device in a camera according to this invention.

One embodiment of this invention will be described with reference to the accompanying drawing. FIG. 1 is a block diagram showing one example of a control device according to the invention. The control device comprises: an automatic shutter control circuit including a light measurement arithmetic circuit (ASC); a manual shutter control circuit (MSC); an automatic-manual change-over switch (AMCS); a first selection circuit (FSC); for selecting by priority one of the automatic shutter control circuit and the manual shutter control circuit according to the information on the opening and closing operation of the automatic-manual change-over switch. The device also includes a flash synchronization shutter control circuit (XSC) (hereinafter referred to as "an X shutter control circuit" when applicable); a detection switch for detecting whether or not a flashgun is mounted on the camera; a flashgun charge signal input terminal (FCSI); and a second selection circuit (SSC) for selecting by priority one of the X shutter control circuit and the one, selected by priority, of the automatic shutter control circuit and the manual shutter control circuit according to two pieces of information. That is, the opening and closing operation of the detection switch (hereinafter referred to as "first information") and a voltage level applied to the flashgun charge signal input terminal (hereinafter referred to as "second information":) or according only to the first information is determined. FIG. 1 also shows a bottom curtain controlling magnet drive circuit (BCMD) which is controlled by the control circuit selected by the second selection circuit and a display circuit driven only by the X shutter control circuit.

The operation of the circuitry thus organized will now be described.

In the case where a flashgun is not installed on the camera, the automatic shutter control circuit or the manual shutter control circuit is connected through the first and second selection circuits to the bottom curtain controlling magnet drive circuit. In this case, automatic shutter control or manual shutter control is obtained, and the display circuit is not driven.

When a flashgun having no charge signal terminal (or an ordinary flashgun) is installed on the camera, then the X shutter control circuit is connected through the second selection circuit to the bottom curtain controlling magnet drive circuit by the on-off operation of the detection switch which supplies the first information. As a result, the X shutter control is obtained, and the display circuit is driven to display the X shutter control in the finder.

When a flashgun having a charge signal terminal (or an "exclusive flashgun") is installed on the camera, but it is not charged, the automatic shutter control circuit or the manual shutter control circuit is still selected by the first selection circuit according to the first information concerning the on-off operation of the switch. This together with second information that the input voltage is lower than a predetermined value, is connected through the second selection circuit to the bottom curtain controlling magnet drive circuit. In this case, automatic shutter control or manual shutter control is obtained and the display circuit is not driven.

When the exclusive flashgun on the camera is completely charged, then the X shutter control circuit is connected through the second selection circuit to the bottom curtain controlling magnet drive circuit by the first information concerning the on-off operation of the switch. The second information is that the input voltage is higher than the predetermined value. In this case, X shutter control is obtained, and the display circuit is driven to display the X shutter control in the view finder.

Figure 2:
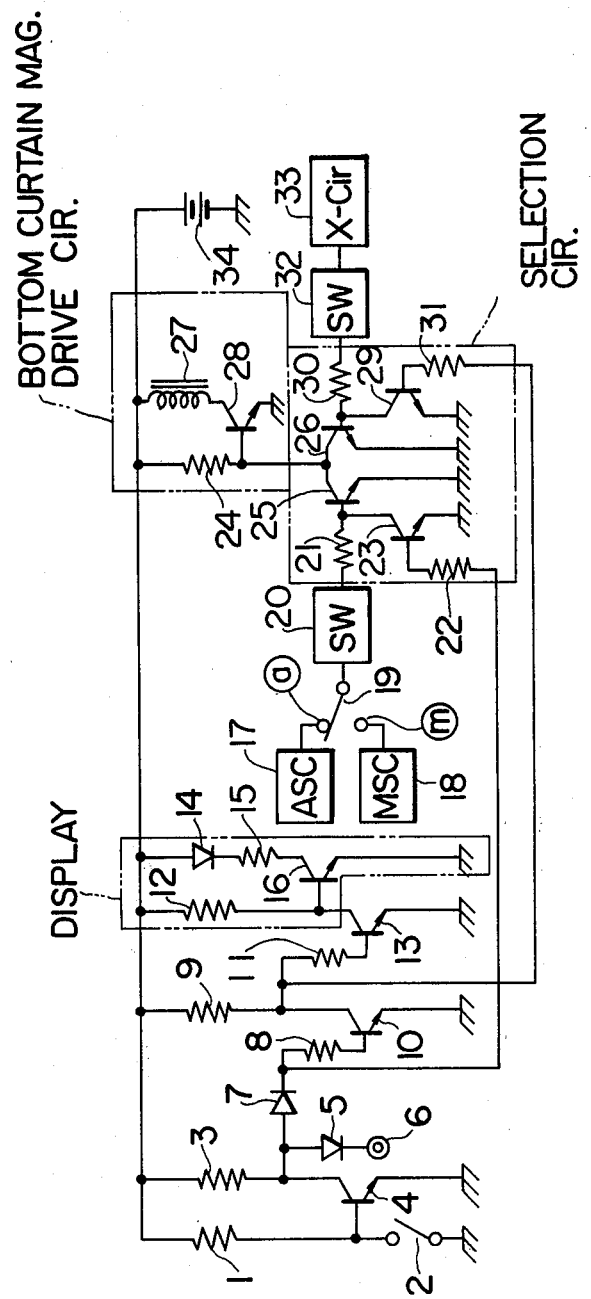
FIG. 2 is an electrical circuit diagram showing one example of the control device in a camera according to the invention.

FIG. 2 is an electrical circuit diagram showing one example of the device according to the invention. In the circuit in FIG. 2, a resistor 1 and a switch 2 (or a detection switch 2) are connected in series to the power source 34. The switch 2 is turned off when the flashgun is mounted on the camera, and it is turned on when the flashgun is removed from the camera. The connection of the resistor 1 and the switch 2 is connected to the base of a transistor 4. The collector of the transistor 4 and a resistor 3 are connected in series to the power source 34.

The connection of the resistor 3 and the transistor 4 is connected to the anodes of diodes 5 and 7. The cathode of the diode 5 is connected to a terminal adapted to transmit the charge signal of the flashgun (hereinafter referred to as "a charge signal terminal"). The cathode of the diode 7 is connected through a resistor 8 to the base of a transistor 10, and through a resistor 22 to the base of a transistor 23. The collector of the transistor 10 and a resistor 9 are connected in series to the power source 34. The connection of the resistor 9 and the collector of the transistor 10 is connected through a resistor 11 to the base of a transistor 13, and through a resistor 31 to the base of a transistor 29. The collector of the transistor 13 and a resistor 12 are connected in series to the power source 34. The connection of the resistor 12 and the collector of the transistor 13 is connected to the base of a transistor 16. A light emitting diode 14, a resistor 15 and the collector of the transistor 16 are connected in series to the power source 34.

In FIG. 2, reference numeral 17 designates a control circuit for determining an automatic shutter time (hereinafter referred to as "an ASC circuit" when applicable); and reference numeral 18, a control circuit for determining a manual shutter time (MSC) (hereinafter referred to as "a manual circuit" when applicable). An automatic-manual change over switch having an automatic side contact (a) connected to the ASC circuit and a manual side contact (m) connected to the manual circuit is designated as element 19; and 20 is a switching circuit.

The switching circuit 20 is switched in response to the output signal of the ASC circuit 17 or the manual circuit 18. The output of the switching circuit 20 is connected to a selection circuit through a resistor 21 to the collector of a transistor 23 and the base of a transistor 25. One end of a resistor 24 is connected to the power source 34, and the other end is connected to the base of a transistor 28 and to the collectors of transistors 25 and 26.

A bottom curtain controlling magnet 27 and the collector of the transistor 28 are connected in series to the power source 34. Reference numeral 33 designates a control circuit for determining an X shutter time (hereinafter referred to as "an X circuit":), and reference numeral 32 designates a switching circuit which is switched in response to the output signal of the X circuit 33. The output of the switching circuit 32 is connected to the selection circuit through a resistor 30 to the base of the transistor 26 and the collector of the transistor 29.

The operation of the circuit of FIG. 2 will now be described.

When the flashgun is not mounted on the camera (hereinafter referred to as "a first mode" when applicable), the detection switch 2 is in "off" state, the transistor 4 is conductive, and the charge signal terminal 6 is in "open" state. Therefore, all the current passing through the resistor 3 is applied to the transistor 4, and no base current is supplied to the bases of the transistors 10 and 23. Accordingly, the transistors 10 and 23 are rendered non-conductive. As a result, the transistor 13 is rendered conductive, while the transistor 16 is rendered non-conductive, so that the light emitting diode 14 is not turned on. At the same time, the transistor 29 is rendered conductive, while the transistor 26 is rendered non-conductive.

As a result, the bottom curtain controlling magnet 27 is controlled in priority by the output of the switching circuit 20 applied through the transistor 25. Thus, when the armature of the automatic-manual change-over switch 19 is tripped to the contact (a), automatic shutter control is obtained; and when the armature of the switch 19 is tripped to the contact (m), manual shutter control is obtained.

When an ordinary flashgun is mounted on the camera (hereinafter referred to as "a second mode" when applicable), the detection switch is turned on, the transistor 4 is rendered non-conductive, and the charge signal terminal is in the "open" state. Therefore, base current is applied through the resistor 3, the diode 7 and to the transistors 10 and 23. As a result, the transistors 10 and 23 are rendered conductive. Therefore, the transistors 13 and 29 are rendered non-conductive, and the bottom curtain controlling magnet 27 is controlled through the transistor 26 by the output of the switching circuit 32. Since the switching circuit 32 is controlled by the X circuit 33, X shutter control is obtained. Because the transistor 16 is rendered conductive, the light emitting diode is turned on, so that X shutter control is displayed in the view finder.

In the case where the exclusive flashgun is connected to the camera but it is not yet charged, the detection switch 2 is turned on, but a voltage substantially at zero volts is applied to the charge signal terminal 6. Therefore, while the transistor 4 is non-conductive, only the voltage corresponding to one diode is developed at the anode of the diode 7. Thus, all the current through the resistor 3 flows into the diode 5, not into the diode 7. Therefore, the operating state of the circuit is similar to that in the first mode. Accordingly, automatic shutter control or manual shutter control is obtained.

In the case where the exclusive flashgun is installed on the camera and it has been satisfactorily charged, the detection switch 2 is turned on, and a voltage higher than the sum of the voltage $V_{BE}$ of the conductive transistors 10 or 23 and a voltage developed across the resistors 8 or 22 by the base current of the conductive transistors 10 or 23 is applied to the charge signal terminal 6. Therefore, the base current is applied through the resistor 3 and the diode 7 to the transistors 10 and 23. Thus, the state of the circuit is similar to that in the second mode. X shutter control is obtained, and this state of control is displayed in the view finder by the light emitting diode 14.

In the example shown in FIG. 2, the state of the detection switch, which is adapted to determine whether or not the flashgun is mounted on the camera, is changed from the "off" state to the "on" state when the flashgun is mounted on the camera. However, the invention is not limited thereto or thereby. That is, the broad technical concept of this invention can be applied to a control device provided with a detection switch wherein the state is changed from the "on" state to the "off" state when the flashgun is connected to the camera.

According to the invention as described above, if the exclusive flashgun installed on the camera is not yet charged, ordinary automatic or manual shutter control is effectuated. If the exclusive flashgun installed on the camera has been fully charged, the shutter control is switched to the flash synchronization shutter control (X shutter control), which is displayed in the view finder. If an ordinary electronic flash is mounted on the camera, the shutter control is automatically switched to the flash synchronization shutter control (X shutter control), which is displayed in the view finder. Thus, the range of application of the device according to the invention is considerable. With the device, the failure in taking pictures with a flashgun can be eliminated.

It is apparent that other modifications may be made without departing from the scope of the invention.

What is claimed is:

1. A device for providing multi-mode camera shutter control according to flashgun mounting and flashgun charging status, said camera having electrically controlled automatic shutter operating means, manual shutter operation means, and X shutter control means for flashgun operation, said device for providing multi-mode camera shutter control comprising:

a detection switch means for detecting the presence of a flashgun on said camera;

an input terminal providing an indication of the charge on said flashgun; and multi-mode control means for controlling said camera shutter according to one of said automatic shutter operation means and said manual shutter operation means
   (i) when said detection switch means detects a flashgun, said flashgun has a charge output terminal, and said input terminal indicates an insufficient charge on said flashgun in response to said charge output terminal, and
   (ii) when said detection switch means does not detect a flashgun; and said multi-mode control means controlling said camera shutter according to said X shutter control means
   (i) when said detection switch means detects a flashgun, said flashgun has a charge output terminal, and said input terminal indicates a sufficient charge on said flashgun in response to said charge output terminal, and
   (ii) when said detection switch means detects a flashgun, and said flashgun has no charge output terminal connected to said input terminal, whereby said device for providing multi-mode camera shutter control may be used with either a flashgun having a charge output terminal, or a flashgun without a charge output terminal.

2. The device of claim 1 wherein said camera further comprises a bottom curtain drive circuit, and said control means comprises a first switching circuit to selectively couple either said automatic or manual shutter control circuits to said bottom curtain drive circuit.

3. The device of claim 2 wherein said control means further comprises (i) a second switching circuit, said X shutter control circuit providing an output to said second switching circuit, and (ii) a selection circuit for selecting either X shutter control or the output of said first switching circuit, depending on inputs from said detection switch and said input terminal.

4. The device of claims 1, 2 or 3 further comprising display means to indicate when X shutter control is selected by said control means.

5. The device of claim 4 wherein said display means comprises a transistor switch having a grounded emitter, and a parallel circuit comprising a resistor coupled to the base of said transistor switch and a series connected light emitting diode and resistor coupled to the collector of said transistor switch.

6. The device of claim 3 further comprising display means to indicate X shutter control and said selection circuit comprises first transistor switch means receiving the output of the first switching circuit and second transistor switch means receiving the output of said X shutter control circuit, said selection circuit providing an output to said bottom curtain drive circuit.

7. The device of claim 6 wherein said first and second transistor switch means are coupled by common collectors and said output is taken from said common collector coupling.

8. The device of claim 7 wherein said first and second transistor switch means each comprise first and second transistors having grounded emitters, the base of said first transistor coupled to the collector of said second transistor, said collectors of said first transistors being commonly coupled.

9. The device of claim 3 wherein said bottom curtain drive circuit comprises a transistor switch having a grounded emitter, the base of said transistor coupled to said second selection circuit and a bottom curtain controlling magnet coupled to the collector of said transistor switch.

* * * * *